United States Patent
Lee et al.

(10) Patent No.: US 6,828,362 B1
(45) Date of Patent: Dec. 7, 2004

(54) PTC COMPOSITION AND PTC DEVICE COMPRISING IT

(75) Inventors: Yong-In Lee, Seoul (KR); Hyun-Nam Cho, Seoul (KR); Jong-Hawk Kim, Seoul (KR)

(73) Assignee: Shinwha Intertek Corp. (KR)

( * ) Notice: Subject to any disclaimer, the term of this patent is extended or adjusted under 35 U.S.C. 154(b) by 57 days.

(21) Appl. No.: 10/169,142

(22) PCT Filed: Nov. 28, 2000

(86) PCT No.: PCT/KR00/01372

§ 371 (c)(1),
(2), (4) Date: Oct. 11, 2002

(87) PCT Pub. No.: WO02/38669

PCT Pub. Date: May 16, 2002

(30) Foreign Application Priority Data

Oct. 28, 2000  (KR) ........................................ 2000/63731

(51) Int. Cl.[7] .............................. C08L 3/00; C08L 89/00
(52) U.S. Cl. .................. 524/47; 524/496; 524/556; 524/563; 524/502; 524/527; 524/520; 524/514; 524/521; 524/506; 524/513
(58) Field of Search ................................ 524/496, 556, 524/563, 502, 527, 520, 514, 521, 506, 513, 47

(56) References Cited

U.S. PATENT DOCUMENTS 5,174,924 A  * 12/1992  Yamada et al. ............. 252/511

FOREIGN PATENT DOCUMENTS

| JP | 60-76393 | 4/1985 |
|----|----------|--------|
| JP | 63-132965 | 6/1988 |
| JP | 3-85167 | 4/1991 |
| JP | 8-259746 | 10/1996 |
| JP | 2000-109615 | 4/2000 |
| KR | 1995-0013664 | 11/1995 |
| KR | 1998-016631 | 6/1998 |

* cited by examiner

Primary Examiner—Peter D. Mulcahy
(74) Attorney, Agent, or Firm—Dickstein, Shapiro, Morin & Oshinsky, LLP

(57) ABSTRACT

The present invention relates to a conductive polymer composition which exhibits PTC characteristics (PTC composition) and a PTC device comprising it, wherein the PTC composition comprises: a) at least one crystalline olefin-based polymer and at least one ionomer; and, b) electrically conductive particles which have been dispersed in polymer matrix formed by a). The PTC composition according to the present invention has an enhanced adhesion to electrodes, which minimizes contact resistance and increases the maximum working current (hold current). The PTC device comprising the PTC composition can be used as a circuit protection device which protects circuit from overflowing and which holds initial resistance value although it is reused after multiple short circuit have taken place.

20 Claims, 1 Drawing Sheet

PTC COMPOSITION AND PTC DEVICE COMPRISING IT

TECHNICAL FIELD

The present invention relates to a conductive polymer composition having PTC (positive temperature coefficient) characteristics (that is, PTC composition) and to a PTC device using the same.

BACKGROUND ART

A conductive material exhibiting a resistance change according to a temperature change and a device using the same have been well known. A conventional PTC resistor has been known as a PTC thermistor using a doped $BaTiO_3$ ceramic material. A thermistor made of the ceramic material exhibits a sharp PTC resistance effect at a higher temperature than its Curie temperature. Although the PTC device made of the ceramic material has long been used, it has a problem that it is restricted in applications and causes a high process expense because it has a relatively high resistance value at room temperature.

In an effort to solve the above problem, a conductive polymer composition that can be more easily fabricated compared to the conventional ceramic process, as well as which has a small resistance value at room temperature, has been developed. As examples, U.S. Pat. No. 4,237,441, U.S. Pat. No. 4,545,926 and U.S. Pat. No. 5,880,668 are given.

The conductive polymer compositions disclosed in the above documents exhibit "PTC characteristics" in which it has an electrical conductivity by uniformly dispersing carbon black or metal as a conductive filler into a polymer matrix, whereby its resistance is increased in proportion to a temperature rise, and its resistance is rapidly increased when the temperature goes up to higher than a certain point called a switching temperature.

The polymers used for the conventional PTC composition are mostly olefin-based polymers, for example, polyethylene (PE), polypropylene (PP), ethylene/propylene co-polymers and ethylene-based co-polymers such as ethylene/(meta) acrylic acid co-polymers, ethylene/ethyl acrylate co-polymers, ethylene/butyl acrylate co-polymers and ethylene/vinyl acetate co-polymers. Besides, polyvinyl-based co-polymers such as polyvinylchloride, polyvinylidenechloride, polyvinylfluoride, polyvinylidenfluoride, thermoplastic polymers such as polyamide, polystyrene, polyacrylonitrile, silicone resins, polyester, a modified cellulose or polysulfone may be used.

The PTC composition is typically used as a circuit protection device for limiting a current flow when a short-circuiting has taken place in the circuit comprising a heater, a positive character thermistor, a thermo-responsive sensor, a battery or the like, and for recovering the circuit to a normal state when the cause of the short-circuiting is removed. In addition, as an example of using the PTC composition, a PTC device, in which more than two electrodes are electrically connected to the PTC composition, can be given. The electrodes are connected to a power supply so that the current can flow through the PTC component. The PTC device is used as a protecting device for a circuit from current overload, overheating and the like, by functioning as a self-temperature controller as described above.

The device generally allows current to flow through a circuit since the resistance is low enough at a temperature below the switching temperature (Ts). However, at a temperature above the switching temperature, it does not allow any further current to flow, by rapidly increasing the resistance. In other words, when the circuit is heated to a critical temperature, the PTC device functions as a circuit protecting device for decreasing a current overload caused by a short-circuiting to a lower and stable value. When the cause of the short-circuiting is removed, the PTC device is cooled down below the critical temperature and returned to the low resistance state of its normal operation. Such effect is called a "reset". The composition of which the PTC device is constructed is necessary to have such a current limiting performance and reset property allowing a repeated use at high voltage.

A polymer PTC electric circuit protecting device is generally formed by inserting a PTC component, which is fabricated by dispersing electrically conductive fine particles such as of a metal or carbon black into polymers, between a pair of electrodes. The electrodes are connected to a power supply so that the current can flow through the PTC component. In order to minimize a contact resistance, the electrodes are generally attached to the PTC composition by a thermo-fusion. However, in such methods, adhesion between components in the composition has been a problem. In order to overcome the problem, in the past, the surface of the electrodes was chemically or physically treated to be rough, or specially fabricated electrodes have been used (Japanese Laid Open Publication No. 5-109502 and U.S. Pat. No. 3,351,882, etc.). However, those methods have disadvantages in that the problem of contact resistance is not satisfactorily solved, and it is difficult to expect the repetition stability returning to the same resistance value as that of the initial stage even after several times of short-circuiting have taken place.

In addition, when a high working current is required even though Its size is limited such as in a lithium ion battery, the PTC device to be inserted into the circuit is also limited in size. In general, in case of a PTC device, the maximum current value (that is, a hold current, $I_{Hmax}$), which is maintained at a normal working state without switching, differs according to the power consumption. The power consumption is related to an initial resistance of the device. The lower the initial resistance is, relatively the less the power consumption is, and accordingly, the PTC device can have a high maximum hold current. Thus, in the PTC device, as it has a high maximum hold current, in order to lower the resistance value of the device, the distance between a pair of electrodes is made short or the surface area of the electrodes has to be enlarged. If the space between the two electrodes becomes narrow, the resistance value of the device is lowered down as much. However, if the space between the electrodes is too narrow, a PTC component constructed therebetween may easily be cracked by even a Weak external impact, and it is not easy to manufacture, too. Therefore, in general, the area of the electrodes is enlarged while maintaining a certain thickness. In this respect, if the resistance value of the PTC component inserted between the electrodes is not low enough, the size of the formed device should be inevitably enlarged to larger than the limited circuit size to have a high hold current. In addition, if the contact resistance is high due to an insufficient adhesion, power consumption may be concentrated in the interface of the electrodes and the PTC component, and accordingly it is impossible to obtain the high maximum hold current.

In other words, the resistance value of the PTC component itself and the contact resistance between the electrodes and the PTC component should be low enough so as to retain a high hold current while allowing the PTC device to be inserted into a limited size of circuit to have a sufficiently small size.

SUMMARY OF THE INVENTION

Therefore, an object of the present invention is to solve problems of conventional device, and to provide a PTC composition that exhibits a low resistance and a favorable electrical conductivity when a common current flows in a circuit. In particular, the PTC composition of the present invention is capable of minimizing a contact resistance by improving an adhesion in the interface of the electrodes and the PTC composition without any special treatment to the electrodes and is capable of having a high maximum hold current.

Another object of the present invention is to provide a circuit protecting device that is capable of maintaining an initial resistance value repeatedly and stably even in passing a current due to several times of short-circuiting.

The above and other objects described in the detailed description of the invention are achieved by providing a PTC composition comprising, a) a crystalline olefin-based polymer and an ionomer and b) conductive particles dispersed in a polymer matrix formed with a).

DETAILED DESCRIPTION OF THE INVENTION

Figure 1:
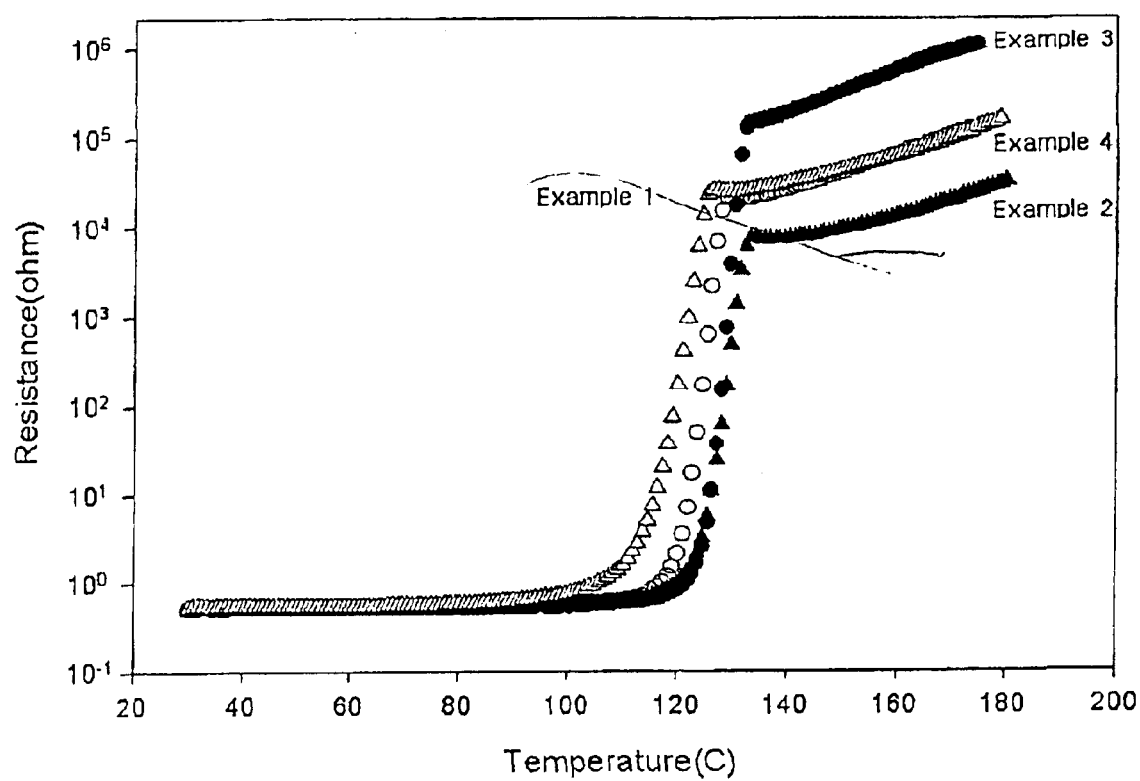
FIG. 1 is a graph showing PTC characteristics of a PTC composition obtained by Examples 1 through 4.

The present invention relates to a PTC composition which has a low resistance and a favorable electrical conductivity when a common current flows, and which is, in particular, capable of minimizing a contact resistance by improving an interfacial adhesion between electrodes and the PTC composition without any special treatment to the electrodes and which has a substantially high hold current even in a small size. In particular, the present invention relates to a PTC composition comprising, a) a crystalline olefin-based polymer and an ionomer and b) conductive particles dispersed in a polymer matrix formed with a).

The crystallinity of the olefin-based polymer used for the PTC composition of the present invention is to be at least 10%, and, preferably, at least 20%, and, more preferably, at least 40%. The content of the olefin-based polymer is adjusted to be at least 60% by weight and, preferably, in the range of 60–99.5% by weight of the total polymer weight in the PTC composition.

The olefin-based polymer is preferably selected from the group consisting of polyethylene (PE), polypropylene (PP), a co-polymer of ethylene and a monomer having a polar group, a co-polymer of propylene and a monomer having a polar group and mixtures thereof.

Examples of the polyethylene include a high-density polyethylene (HDPE), a middle-density polyethylene (MDPE) and a low-density polyethylene (LDPE), a linear low-density polyethylene (LLDPE) and mixtures thereof, of which the high-density polyethylene is more preferable.

Examples of the co-polymer of ethylene or propylene with a monomer having a polar group include ethylene/ acrylic acid co-polymers, ethylene/methacrylic acid co-polymers, ethylene/ethyl acrylate co-polymers, ethylene-butylacrylate co-polymers, ethylene-vinylacetate co-polymers, ethylene-itaconic acid co-polymers, ethylene/ monomethyl malate co-polymers, ethylene/maleic acid co-polymers, ethylene/acrylic acid/methylmethacrylate co-polymers, ethylene/methacrylic acid/ethyl acrylate co-polymers, ethylene/monomethyl malate/ethyl acrylate co-polymers, ethylene/methacrylic acid/vinylacetate co-polymers, ethylene/acrylic acid/vinylalcohol co-polymers, ethylene/propylene/acrylic acid co-polymers, ethylene/styrene/acrylic acid co-polymers, ethylene/ methacrylic acid/acrylonitril co-polymers, ethylene/fumaric acid/vinyl methyl ether co-polymers, ethylene/ vinylchloride/acrylic acid co-polymers, ethylene/vinylidene chloride/acrylic acid co-polymers, ethylene/ trifluoroethylene chloride/methacrylic acid co-polymers and corresponding propylene co-polymers.

Maleic anhydride-grafted polyethylene, and more specifically, maleic anhydride-grafted high-density polyethylene (m-HDPE) or maleic anhydride-grafted low-density polyethylene (m-LDPE), etc. can also be used for the PTC composition of the present invention.

Preferably, the olefin-based polymer is selected from the group consisting of high-density polyethylene, maleic anhydride-grafted high-density polyethylene, ethylene/ethyl acrylate co-polymers, ethylene/vinylacetate co-polymers and mixtures thereof.

Examples of the ionomer used for the PTC composition of the present invention together with the olefin-based polymer include an ethylene-based ionomer, a styrene-based ionomer, a rubber-based ionomer, a fluorine-based ionomer, a sulfonated EPDM, a carboxylated nitril-based ionomer and combinations thereof. Preferably, the ionomer is selected from the group consisting of ethylene-based ionomers, styrene-based ionomers, rubber-based ionomers and combinations thereof.

Preferably, the ethylene-based ionomer has the following formula (I):

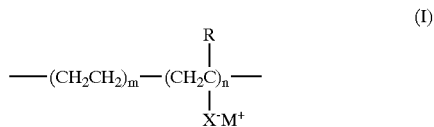

(I)

In formula (I), R represents hydrogen or methyl; $X^-$ represents $COO^-$ or $C_6H_4SO_3^-$; and $M^+$ represents a metallic ion or an ammonium ion substituted with an alkyl or aryl group.

If the $M^+$ is a metallic ion, it is preferably selected from the group consisting of monovalent, divalent and trivalent metallic ions including $Li^+$, $Na^+$, $K^+$, $Mg^{2+}$, $Ca^{2+}$, $Ba^{2+}$, $Zn^{2+}$ and $Al^{3+}$. If $M^+$ is an ammonium ion substituted with an alkyl or aryl group, it is preferably selected from the group consisting of tetrabutylammonium ion and cetyltrimethylammonium ion.

Examples of the ionomer having the formula (I) include a co-polymer of ethylene/methacrylic acid sodium salt, a co-polymer of ethylene/acrylic acid zinc salt, and a co-polymer of ethylene/styrene sulfonic acid sodium salt. Those ionomers are sold in the market under the names of Surlyn®, Aclyn®, Lucalen®, Lotek®, Escor®, etc.

In formula (I), the ratio of m/n is not necessarily limited, and it may be no less than 0.1, more preferably, no less than 1, and most preferably, no less than 5.0.

Examples of the styrene-based ionomer include styrene/ sodium (metha)acrylate co-polymers and styrene/butyl methacrylate/zinc acrylate co-polymers.

Examples of the rubber-based ionomer include butadiene/lithium methacrylate co-polymers and butadiene/sodium acrylate co-polymers. Such ionomers are sold in the market under the name of Hycar®.

As a fluoride-based ionomer, the material sold currently under the name of Nafion® or Flemion® may be used.

The amount of the ionomer used is not necessarily limited, but it is preferred to be added 0.5–40% by weight and more preferably, 2–20% by weight to the total polymer content. The PTC composition containing the ionomer according to the present invention has a unique physical cross-linking structure due to the ionomer in the polymer composition. Such structure seems to be made by the ionic bond formed between a metallic ion and acid group of the polymer.

Besides the olefin-based polymer and ionomer, the PTC composition of the present invention may additionally contain a polyvinyl-based polymer such as polyvinylchloride, polyvinylidenechloride, polyvinylfluoride and polyvinylidenfluoride; polyamide; polystyrene; polyacrylonitril; silicone resin; polyester; modified cellulose; and thermoplastic polymer material such as polysulfone. When added, the content may be adjusted in the range of 0.5–50% by weight of the total polymer content.

The conductive particles dispersed in the polymer matrix are used to give conductivity to the PTC composition of the present invention. The types of usable conductive particles are not necessarily limited as long as they are typical conductive particles used for the PTC composition. Examples include powders of metal such as nickel, silver, gold, copper or metal alloys, metal-coated particles, carbon black and acetylene black.

The amount of the conductive particles used differs depending on the type of the substance to be used. It is preferably 5–70% by weight of the total PTC composition.

Preferred conductive particles are carbon black. The average particle size of carbon black is preferably at least 60nm with uniform particle size distribution. Specific examples of carbon black which can be used for the present invention include Conductex 975, Raven 420, Raven 430, N660 of Columbian Chemicals Co., and Black Pearl 120, Black Pearl 130, Black Pearl 160, Vulcan XC72, etc. of Cabot Co., but are not limited thereto.

The conductive particles have a different dispersion mechanism within the polymer composition according to the polarity of the polymer used. As the polarity is higher, the mutual force between the conductive particles and polymer resins is strengthened, and therefore, the bonding between the polymer resin and the carbon particles become stronger. Due to this effect, the form of the dispersion of the conductive particles in the polymer resin composition has a different characteristic. That is, the distribution of the conductive particles is influenced by the distribution structure of the ionomer having the polar group used in the PTC composition of the present invention. As a result, an electronic passageway can be easily made relatively in the PTC composition of the present invention, and these are the features of the present invention. Accordingly, even if the same conductive particles as in a conventional PTC composition are used, unlike the conventional PTC composition, the PTC composition of the present invention has a lower resistance, and therefore, the maximum hold current can be increased. In addition, the interaction between the conductive particles and the polymers is constant regardless of a temperature rise, so that change of the particles' position or aggregation of particles within the polymer matrix can be restrained. Accordingly, when cooled, the matrix is shrunk, and thereby the initial state of distribution is maintained. Therefore, a restoration stability, by which the resistance is restored to its initial value when the normal working state is restored after the resistance is much increased when the temperature goes up due to a current overload in the device, can be considerably increased. Addition of the ionomer having a polar group to the PTC composition is helpful to increase the adhesion between electrodes and the PTC composition, and besides, it contributes to the enhancement of the stability of the PTC device.

The PTC composition of the present invention may further contain a co-processing agent not influencing on the properties of the composition, such as an antioxidant, an anti-degradation agent, an anti-foaming agent and the like.

The PTC device of the present invention is constructed in the following manner. Conductive particles, preferably, a carbon black, and an antioxidant are added to a mixture of an olefin-based polymer and ionomer, the resulting mixture is blended using a Bravendar, Bnbari, homo-mixer or the like, and then at least one metallic electrode is shaped to the obtained conductive polymer composition. After shaping, in order to improve stability and reliability of the device, the obtained polymer PTC composition is cross-linked by mainly using an electron beam. At this time, according to the type, content and thickness of the composition, the electron beam is irradiated at a strength of 1–100 Mrads, preferably, 5–50 Mrads. The shape of the electrode is determined depending on the shape of the device. For example, there is a foil, wire, powder, paste or the like of a metal. In the present invention, two thin metallic films are attached onto both sides of the conductive polymer composition, to be shaped as the plate-type polymer composition is inserted between two electrodes. A lead electrode is shaped onto the two plate-shape electrodes so as to be connected to an electric circuit. A wire or plate of a metal is soldered at the lead electrode. The material of the electrode may be a metal such as iron, copper, tin, nickel, silver or the like.

The circuit protecting device with such a shaped electrode usually has a resistance of below 5 Ω, preferably below 1 Ω, and more preferably below 0.1 Ω, at room temperature (25° C.). When the temperature rises, at a higher temperature than a critical temperature where the device is switched, the maximum resistance value becomes at least $10^3$ Ω, and preferably at least $10^4$ Ω.

EXAMPLES

The present invention will now be described clearly with the following examples, but the scope of the present invention is not limited thereto.

Example 1

90 parts of high-density polyethylene (HDPE), 10 parts of ionomer Surlyn 7930, 100 parts of carbon black (Raven 420, Columbian Chemicals Co.) as a conductive material and 0.4 parts of antioxidant (Irganox 1010, Ciba-Geigy Co.) were mixed at a speed of 60 rpm at 170° C. for 20 minutes by using a Bravendar mixer (Plasti-corder, PLE 331).

The mixed composition was put into a mold, pressed to make a thin plate of 0.5 mm in thickness under a pressure of 450 Kgf/cm² at 180° C. by using a hydraulic press, set aside under a pressure of 110 Kgf/cm² at 80° C. for one hour, and then allowed to return to room temperature and atmospheric pressure.

An electro-deposited copper foil of 30 μm in thickness having a micro-level of roughness on the surface of one side was melted and pressed to both sides of the plate of the conductive polymer composition obtained as described above, thereby to shape plate-type electrodes.

The plate of the conductive polymer composition stacked with the plate-type electrodes was cross-linked at an irradiation strength of 20 Mrads by using a particle beam accelerator and shaped in a disk type having a diameter of 12.7 mm by using a punch.

And then, the obtained device and tin-coated copper wire were put into a solvent which is used for removing oxide from a melted metal and preventing additional oxidation of the melted metal and put again into a melted solder bath. The PTC device and the tin-coated copper wire were then taken out from the solder bath, cooled, and the tin-coated copper wire was attached to the surface of the plate-type electrodes stacked onto the PTC device.

The electrical and PTC properties of the electric circuit protecting device fabricated as described above were measured by the following procedures, and the results are shown in Table 1.

(1) The device was set aside at a temperature above the melting point of the polymer composition used for the fabrication of the device for 10 minutes, cooled to room temperature, and then its resistance was measured. While the temperature around the device was gradually raised at a rate of 2° C./min, the resistance change according to the temperature change was measured with a digital multimeter (Keithley 2000). The ratio between the initial and maximum resistance values was calculated by using the resistance value change measured and indicated as "PTC intensity".

(2) After the PTC device was inserted into a circuit constructed for measuring the maximum hold current, a stabilized current within the device was measured while gradually increasing an applied voltage by taking 0.05 V as one step. The voltage was continuously increased until the device was completely switched. While increasing the applied voltage, the current value that passed through the PTC device was measured, and the maximum current value was defined as a "maximum hold current, $I_{Hmax}$". If the voltage is increased over this point, the current falls down.

Comparative Example 1

Instead of 90 parts of HDPE and 10 parts of ionomer Surlyn 7930 of Example 1, 100 parts of HDPE was used to fabricate a PTC device in the same manner as described in Example 1. Physical properties of the PTC device were measured, and the results are shown in Table 1.

Example 2

Instead of the 10 parts of ionomer Surlyn 7930 in Example 1, 95 parts of maleic anhydride-grafted HDPE (m-HDPE) and 5 parts of ionomer Surlyn 8660 were used to fabricate a PTC device in the same manner as described in Example 1. Physical properties of the PTC device were measured, and the results are shown in Table 1.

Comparative Example 2

Instead of the 95 parts of maleic anhydride-grafted HDPE (m-HDPE) and the 5 parts of Surlyn 8660 in Example 2, 100 parts of maleic anhydride-grafted HDPE (m-HDPE) was used to fabricate a PTC device in the same manner as described in Example 1. Physical properties of the PTC device were measured, and the results are shown in Table 1.

Example 3

Instead of the 90 parts of HDPE and the 10 parts of ionomer Surlyn 7930 in Example 1, 95 parts of maleic anhydride-grafted HDPE (m-HDPE) and 5 parts of ionomer Aclyn 295 were used to fabricate a PTC device in the same manner as described in Example 1. Physical properties of the PTC device were measured, and the results are shown in Table 1.

Example 4

Instead of the 90 parts of HDPE and the 10 parts of ionomer Surlyn 7930 in Example 1, 85 parts of maleic anhydride-grafted HDPE (m-HDPE) and 15 parts of ionomer Lotek 8020 were used to fabricate a PTC device in the same manner as described in Example 1. Physical properties of the PTC device were measured, and the results are shown in Table 1.

Example 5

Instead of the 90 parts of HDPE and the 10 parts of ionomer Surlyn 7930 in Example 1, 90 parts of maleic anhydride-grafted HDPE (m-HDPE), 5 parts of ionomer Surlyn 7930 and 5 parts of Aclyn 285 were used to fabricate a PTC device in the same manner as described in Example 1. Physical properties of the PTC device were measured, and the results are shown in Table 1.

Example 6

Instead of the 90 parts of HDPE and the 10 parts of ionomer Surlyn 7930 in Example 1, 90 parts of maleic anhydride-grafted HDPE (m-HDPE) and 10 parts of ionomer styrene/sodium methacrylate co-polymer were used to fabricate a PTC device in the same manner as described in Example 1. Physical properties of the PTC device were measured, and the results are shown in Table 1.

Example 7

Instead of the 90 parts of HDPE and the 10 parts of ionomer Surlyn 7930 in Example 1, 90 parts of maleic anhydride-grafted HDPE (m-HDPE) and 10 parts of ionomer butadiene/sodium acrylate co-polymer were used to fabricate a PTC device in the same manner as described in Example 1. Physical properties of the PTC device were measured, and the results are shown in Table 1.

Example 8

Instead of the irradiation strength of 20 Mrads in Example 1, the cross-linking was carried out with an irradiation strength of 10 Mrads to fabricate a PTC device in the same manner as described in Example 1. Physical properties of the PTC device were measured, and the results are shown in Table 1.

Example 9

Instead of the carbon black (Raven 420, Columbian Chemicals Co.) as a conductive material in Example 1, a carbon black (Monarch 120, Cabot, Corp.) as a conductive material was used to fabricate a PTC device in the same manner as described in Example 1. Physical properties of the PTC device were measured, and the results are shown in Table 1.

Example 10

Instead of the 90 parts of HDPE in Example 1, 80 parts of HDPE and 10 parts of ethylene/ethyl acrylate co-polymer were used to fabricate a PTC device in the same manner as described in Example 1. Physical properties of the PTC device were measured, and the results are shown in Table 1.

Example 11

Instead of the 90 parts of HDPE of Example 1, 85 parts of maleic anhydride-grafted HDPE (m-HDPE) and 5 parts of ethylene/vinylacetate co-polymer were used to fabricate a PTC device in the same manner as described in Example 1. Physical properties of the PTC device were measured, and the results are shown in Table 1.

Example 12

Instead of the 90 parts of HDPE and the 10 parts of ionomer Surlyn 7930 in Example 1, 90 parts of maleic anhydride-grafted HDPE (m-HDPE), 5 parts of polyvinylidenefluoride tri-co-polymer (Kynar 9301, Pennwalt) and 5 parts of ionomer Surlyn 7930 were used to fabricate a PTC device in the same manner as described in Example 1. Physical properties of the PTC device were measured, and the results are shown in Table 1.

Example 13

Instead of the 90 parts of HDPE and the 10 parts of ionomer Surlyn 7930 in Example 1, 85 parts of HDPE, 10 parts of Nylon-12 (Aeson-TL, Elf Atochem) and 5 parts of ionomer Surlyn 7930 were used to fabricate a PTC device in the same manner as described in Example 1. Physical properties of the PTC device were measured, and the results are shown in Table 1.

Example 14

PTC characteristics of the PTC compositions obtained in Examples 1 through 13 and Comparative examples 1 to 3 were tested, and the results are shown in FIG. 1. As shown in FIG. 1, the composition of the present invention has excellent PTC characteristics. In more detail, FIG. 1 shows that the PTC composition of the present invention has PTC characteristics in that it has a low initial resistance value so that the maximum hold current can be increased, its switching temperature is in the range of 100–120° C., and its resistance is sharply increased at a temperature above its switching temperature to be able to cut off current flow.

TABLE 1

| | Physical Properties | | | | |
|---|---|---|---|---|---|
| | Initial resistance at room temperature ($\Omega$) | Resistance at room temperature after witching 100 times ($\Omega$) | Change rate of resistance at room temperature (%) | Maximum hold current (mA) | PTC Intensity ($R_{max}/R_{min}$) |
| Example 1 | 0.50 | 0.77 | 53 | 1837 | $1.8 \times 10^5$ |
| Comparative Example 1 | 0.53 | 1.19 | 122 | 1451 | $9 \times 10^5$ |
| Example 2 | 0.49 | 0.72 | 48 | 2198 | $2.6 \times 10^4$ |
| Comparative Example 2 | 0.58 | 0.96 | 67 | 1821 | $2 \times 10^7$ |
| Example 3 | 0.50 | 0.66 | 32 | 2167 | $1.7 \times 10^6$ |
| Comparative Example 3 | 0.48 | 0.72 | 49 | 1431 | $4 \times 10^5$ |
| Example 4 | 0.49 | 0.64 | 29 | 2000 | $4 \times 10^4$ |
| Example 5 | 0.48 | 0.67 | 40 | 1925 | $3.8 \times 10^5$ |
| Example 6 | 0.47 | 0.63 | 34 | 2067 | $9.6 \times 10^4$ |
| Example 7 | 0.48 | 0.68 | 43 | 2032 | $3.6 \times 10^4$ |
| Example 8 | 0.50 | 0.84 | 68 | 1829 | $4.6 \times 10^4$ |
| Example 9 | 0.60 | 0.91 | 51 | 1729 | $5.7 \times 10^5$ |
| Example 10 | 0.53 | 0.77 | 46 | 1802 | $8.2 \times 10^4$ |
| Example 11 | 0.62 | 0.96 | 55 | 1796 | $6.2 \times 10^4$ |
| Example 12 | 0.78 | 1.35 | 73 | 1052 | $4.5 \times 10^6$ |
| Example 13 | 0.65 | 1.01 | 55 | 2320 | $7.6 \times 10^4$ |

Industrial Applicability

As so far described, the PTC composition of the present invention has the following advantages:

The interfacial adhesion between the PTC composition and electrodes can be improved so that the contact resistance can be minimized even without a special treatment to the electrodes, and accordingly, the maximum hold current can be improved. As shown in Table 1, unlike the conventional PTC composition, the PTC composition of the present invention has a low initial resistance value and is capable of increasing the maximum hold current.

Accordingly, the PTC device comprising the PTC composition of the present invention can be applied as a circuit protecting device which is able to maintain the initial resistance value stably even though it is repeatedly used after several times of short circuit have taken place.

What is claimed is:

1. A conductive polymer composition having PTC characteristics comprising:
   a crystalline olefin-based polymer and an ionomer; and
   conductive particles dispersed in a polymer matrix formed with a);
   wherein the amount of the olefin-based polymer is in the range of 60–99.5% by weight of the total polymer content, the amount of ionomer is in the range of 0.5–40% by weight of the total polymer content, and the content of the conductive particles is in the range of 5–70% by weight of the total weight of the PTC composition.

2. The composition according to claim 1, wherein the crystallinity of the olefin-based polymer is no less than 20%.

3. The composition according to claim 1, wherein the olefin-based polymer is selected from the group consisting of polyethylene, polypropylene, a co-polymer of ethylene with a monomer having a polar group, a co-polymer of propylene with a monomer having a polar group and mixtures thereof.

4. The composition according to claim 1, wherein the olefin-based polymer is selected from the group consisting of a high-density polyethylene, a high-density maleic anhydride-grafted polyethylene, an ethylene/ethyl acrylate co-polymer, an ethylene/vinylacetate co-polymer and mixtures thereof.

5. The composition according to claim 1, wherein the ionomer is selected from the group consisting of an ethylene-based ionomer, a styrene-based ionomer, a rubber-based ionomer, a fluorine-based ionomer, a sulfonated EPDM, a carboxylated nitril-based ionomer and mixtures thereof.

6. The composition according to claim 1, wherein the ionomer is selected from the group consisting of an ethylene-based ionomer, a styrene-based ionomer, a rubber-based ionomer and mixtures thereof.

7. The composition according to claim 1, wherein the ionomer is an ethylene-based ionomer having the following formula (I):

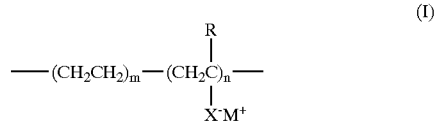

wherein, R represents hydrogen or methyl; X⁻ represents COO⁻ or $C_6H_4SO_3^-$; M⁺ represents a metallic ion or an ammonium ion substituted with an alkyl or aryl group; and m/n is no less than 0.1.

8. The composition according to claim 7, wherein the M⁺ is selected from the group consisting of monovalent, divalent and trivalent metallic ions including $Li^+$, $Na^+$, $K^+$, $Mg^{2+}$, $Ca^{2+}$, $Ba^{2+}$, $Zn^{2+}$ and $Al^{3+}$.

9. The composition according to claim 7, wherein the M⁺ is selected from the group consisting of tetrabutylammonium ion and cetyltrimethylammonium ion.

10. The composition according to claim 1, wherein the ionomer is a styrene-based ionomer selected from the group consisting of styrene/sodium (metha)acrylate co-polymers, styrene/butyl methacrylate/zinc acrylate co-polymers and mixtures thereof.

11. The composition according to claim 1, wherein the ionomer is selected from the group consisting of butadiene/lithium methacrylate co-polymers, butadiene/sodium acrylate co-polymers and mixtures thereof.

12. The composition according to claim 1, wherein the conductive particles used for the PTC composition are selected from the group consisting of powders of metals including nickel, silver, gold, copper and metal alloys, metal coated particles, carbon black and acetylene black.

13. The composition according to claim 1, wherein the conductive particles used for the PTC composition is carbon black.

14. The composition according to claim 1, further comprising a thermoplastic polymer selected from the group consisting of a polyvinyl-based polymer including polyvinylchloride, polyvinylidenechloride, polyvinylfluoride and polyvinylidenefluoride; polyamide; polystyrene; polyacrylonitril; silicone resin; polyester; modified cellulose, polysulfone and mixtures thereof.

15. The composition according to claim 1, further comprising an antioxidant, an anti-degradation agent and/or an anti-foaming agent.

16. A circuit protecting PTC device in which at least two thin metallic films are attached onto both sides of the conductive polymer composition having PTC characteristics according to claim 1, thereby to connect the electrodes electrically.

17. A circuit comprising the circuit protecting PTC device according to claim 16.

18. The composition according to claim 3, wherein the crystallinity of the olefin-based polymer is no less than 20%, and wherein the ionomer is selected from the group consisting of an ethylene-based ionomer, a styrene-based ionomer, a rubber-based ionomer, a fluorine-based ionomer, a sulfonated EPDM, a carboxylated nitril-based ionomer and mixtures thereof, and wherein the conductive particles used for the PCT composition are selected from the group consisting of powders of metals including nickel, silver, gold, copper and metal alloys, metal coated particles, carbon black and acetylene black.

19. The composition according to claim 18, wherein the olefin-based polymer is selected from the group consisting of a high-density polyethylene, a high-density maleic anhydride-grafted polyethylene, an ethylene/ethyl acrylate co-polymer, an ethylene/ethyl acrylate co-polymer and mixtures thereof, and wherein the ionomer is selected from the group consisting of an ethylene-based ionomer, a styrene-based ionomer, a rubber-based ionomer and mixtures thereof.

20. A circuit protecting PTC device in which at least two thin metallic films are attached onto both sides of the conductive polymer composition having PTC characteristics according to claim 19, thereby to connect the electrodes electrically.

* * * * *